(12) United States Patent
Lu et al.

(10) Patent No.: US 11,036,720 B2
(45) Date of Patent: *Jun. 15, 2021

(54) BLOCKCHAIN-BASED HIERARCHICAL DATA STORAGE

(71) Applicant: Advanced New Technologies Co., Ltd., Grand Cayman (KY)

(72) Inventors: Zhonghao Lu, Hangzhou (CN); Haizhen Zhuo, Hangzhou (CN); Benquan Yu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,605

(22) Filed: Feb. 13, 2020

(65) Prior Publication Data

US 2020/0183915 A1 Jun. 11, 2020

Related U.S. Application Data

(63) Continuation of application No. PCT/CN2020/072026, filed on Jan. 14, 2020.

(30) Foreign Application Priority Data

Jun. 28, 2019 (CN) .......................... 201910579371.2

(51) Int. Cl.
*G06F 16/23* (2019.01)
*G06F 16/22* (2019.01)

(52) U.S. Cl.
CPC ...... *G06F 16/2365* (2019.01); *G06F 16/2246* (2019.01)

(58) Field of Classification Search
None
See application file for complete search history.

(56) References Cited

U.S. PATENT DOCUMENTS

| 5,727,150 A | * | 3/1998 | Laudon .................. G06F 12/08 709/215 |
| 7,647,329 B1 | | 1/2010 | Fischman et al. |

(Continued)

FOREIGN PATENT DOCUMENTS

| CN | 108197226 | 6/2018 |
| CN | 108282474 | 7/2018 |

(Continued)

OTHER PUBLICATIONS

Ghoshal et al., "Exploiting Block-Chain Data Structure for Auditorless Auditing on Cloud Data", International Confemece on Information Systems Security, Nov. 2016, 13 pages.

(Continued)

*Primary Examiner* — Uyen T Le
(74) *Attorney, Agent, or Firm* — Fish & Richardson P.C.

(57) ABSTRACT

Methods, systems, and apparatuses are disclosed for blockchain-based hierarchical data storage. One method includes determining, based on a blockchain stored in a database that includes multiple levels of storage, a block number interval that includes one or more block numbers associated with data nodes included in a state Merkle tree stored in a target data storage and to be migrated to a lower level of storage with lower storage cost in response to the data nodes meeting a data migration condition, each of the data nodes is associated with a block number of a block of the blockchain where the corresponding data node is last updated, and the data nodes in the state Merkle tree are in the form of key-value pairs (KVPs), each key of the KVPs comprises a node identifier (ID) and a block number associated with the corresponding data node.

20 Claims, 7 Drawing Sheets

(56) References Cited

U.S. PATENT DOCUMENTS

| | | | |
|---|---|---|---|
| 9,396,131 | B1 | 7/2016 | Hendry |
| 10,242,065 | B1* | 3/2019 | Starling ............... H04L 9/0894 |
| 2004/0245547 | A1 | 12/2004 | Stipe |
| 2008/0195583 | A1* | 8/2008 | Hsu ..................... G06F 16/2455 |
| 2009/0228655 | A1* | 9/2009 | Yamane ............... G06F 3/0611 |
| | | | 711/117 |
| 2014/0188957 | A1* | 7/2014 | Hosoi ................... G06F 16/10 |
| | | | 707/829 |
| 2016/0275201 | A1 | 9/2016 | Li et al. |
| 2017/0255950 | A1 | 9/2017 | Krug |
| 2017/0264684 | A1 | 9/2017 | Spillane et al. |
| 2018/0060596 | A1* | 3/2018 | Hamel ................... G06F 21/64 |
| 2018/0205552 | A1 | 7/2018 | Struttmann et al. |
| 2018/0294977 | A1 | 10/2018 | Uhr et al. |
| 2019/0139043 | A1 | 5/2019 | Davis |
| 2019/0295079 | A1* | 9/2019 | Bae ..................... G06Q 20/401 |
| 2019/0349733 | A1 | 11/2019 | Nolan et al. |
| 2020/0012527 | A1* | 1/2020 | Hartsock ............. G06F 9/45558 |
| 2020/0026548 | A1* | 1/2020 | Huang ................. G06F 16/2379 |
| 2020/0125269 | A1* | 4/2020 | Karame ................ G06F 16/137 |

FOREIGN PATENT DOCUMENTS

| | | |
|---|---|---|
| CN | 108829350 | 11/2018 |
| CN | 109144414 | 1/2019 |
| CN | 109165224 | 1/2019 |
| CN | 109359222 | 2/2019 |
| CN | 109559234 | 4/2019 |
| CN | 109669709 | 4/2019 |
| CN | 109684333 | 4/2019 |
| CN | 109726229 | 5/2019 |
| CN | 109756573 | 5/2019 |
| CN | 109903049 | 6/2019 |
| CN | 109919756 | 6/2019 |
| CN | 110334154 | 10/2019 |
| CN | 110347660 | 10/2019 |
| TW | 201901575 | 1/2019 |
| WO | WO 2018126065 | 7/2018 |
| WO | WO 2019101229 | 5/2019 |

OTHER PUBLICATIONS

Liu et al., "A Data Storage Method Based on Blockchain for Decentralization DNS", 2018 IEEE Third International Conference on Data Science in Cyberspace, Jul. 2018, 8 pages.

PCT International Search Report and Written Opinion in International Application No. PCT/CN2020/072026, dated Apr. 13, 2020, 17 pages (with machine translation).

PCT International Search Report and Written Opinion in International Application No. PCT/CN2020/072030, dated Apr. 13, 2020, 17 pages (with machine translation).

Shao et al., "Blockchain: Architecture and Research Progress", Chinese Journal of Computers, May 2018, 20 pages (with English abstract).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

BLOCKCHAIN-BASED HIERARCHICAL DATA STORAGE

CROSS-REFERENCE TO RELATED APPLICATIONS

This application is a continuation of PCT Application No. PCT/CN2020/072026, filed on Jan. 14, 2020, which claims priority to Chinese Patent Application No. 201910579371.2, filed on Jun. 28, 2019, and each application is hereby incorporated by reference in its entirety.

TECHNICAL FIELD

One or more embodiments of the present disclosure relate to the technical field of blockchain, and more particularly, to a blockchain-based hierarchical storage method and apparatus, and an electronic device.

BACKGROUND

Blockchain technology, also known as distributed ledger technology, is an emerging technology in which several computing devices participate in "record-keeping" and jointly maintain a complete distributed database. Since blockchain technology has the characteristics of decentralization, openness and transparency, each computing device can participate in database records, and data can be quickly synchronized between computing devices, blockchain technology has been widely used in many fields.

SUMMARY

The present disclosure proposes a blockchain-based hierarchical storage method. Data nodes on a state Merkle tree formed by account state data of the blockchain are stored in a database in a form of key-value pairs. A key of a key-value pair is a two-tuple composed of a node ID of a data node and a block number labelled for the data node. In some embodiments, the database includes multi-level data storage. The block number indicates the block where the data node is located when the data node has data update.

In some embodiments, an example of the hierarchical storage method includes determining a block number interval corresponding to data nodes in the target data storage that are to be migrated to the lower level data storage when target data storage of any level in the database satisfies a data migration condition. A migration threshold is determined based on the block number interval, wherein the migration threshold is a block number threshold larger than the block number interval. The two-tuples of data nodes stored in the target data storage are iteratively traversed to search for a target data node having a block number in the two-tuple smaller than the migration threshold. According to the two-tuple of the target data node, the target data storage is further searched to check whether a data node having the same node ID as that of the target data node and the block number in the two-tuple larger than that of the target data node and smaller than the migration threshold exists. If such data node exists, the target data node is migrated to the lower level data storage of the target data storage. Otherwise, the target data node is retained in the target data storage.

In some embodiments, determining the migration threshold based on the block number interval includes determining the right endpoint value of the block number interval as the migration threshold when the block number interval is right-opened. When the block number interval is right-closed, the sum of the right endpoint value of the block number interval and an incremental step size of the block number of the blockchain is determined as the migration threshold.

In some embodiments, searching the target data storage to check whether a data node having the same node ID as that of the target data node and the block number in the two-tuple larger than that of the target data node and smaller than the migration threshold exists includes: searching for a data node stored in the target data storage that has the same node ID as that of the target data node, where the block number in the two-tuple is the largest block number among the block numbers smaller than the migration threshold; and determining whether the block number in the two-tuple of said data node is larger than the block number in the two-tuple of the target data node.

In some embodiments, the example of the method further includes determining data nodes having data updates on the state Merkle tree of the latest block; creating Key-Value pairs for the data nodes having data updates on the state Merkle tree of the latest block, and storing the Key-Value pairs to the highest-level data storage in the database. The key of the Key-Value pair is a two-tuple composed of a block number of the latest block and a node ID of the data node. The Value of the Key-Value pair is the data content contained in the data node.

In some embodiments, the Merkle tree is a variant of the Merkle tree with a tree structure incorporating a Trie dictionary tree. The node ID of the data node is character prefix corresponding to the path from the root node to the data node of the MPT tree.

In some embodiments, the state Merkle tree is a Merkle Patricia Tree (MPT) state tree.

In some embodiments, the database is a LevelDB database or a database based on the LevelDB architecture.

In some embodiments, the database is a Rocksdb database based on a LevelDB architecture.

In some embodiments, the read-write performance of the storage medium corresponding to the multi-level data storage has a difference in performance. The read-write performance of the storage medium corresponding to the high-level data storage is higher than the read-write performance of the storage medium corresponding the low-level data storage.

The present disclosure also proposes a blockchain-based hierarchical storage apparatus, wherein data nodes on a state Merkle tree formed by account state data of the blockchain are stored in a database in a form of key-value pairs. A key of a key-value pair is a two-tuple composed of a node ID of a data node and a block number labelled for the data node. The database includes multi-level data storage. The block number indicates the block where the data node is located when the data node has data update. In some embodiments, an example of the apparatus includes: a determining module configured to, when target data storage of any level in the database satisfies a data migration condition, determine a block number interval corresponding to data nodes in the target data storage that can to be migrated to the lower level data storage; and determine a migration threshold based on the block number interval, wherein the migration threshold is a block number threshold larger than the block number interval; a searching module configured to iteratively traverse the two-tuples of data nodes stored in the target data storage, to search for a target data node having a block number in the two-tuple smaller than the migration threshold; and a migrating module configured to, according to the two-tuple of the target data node, further search the target data storage to check whether a data node having the same node ID as that of the target data node and the block number in the two-tuple larger than that of the target data node and smaller than the migration threshold exists; if such data node exists, migrate the target data node to the lower level data storage of the target data storage; otherwise, retain the target data node in the target data storage.

In some embodiments, the determining module is configured to: when the block number interval is right-opened, determine the right endpoint value of the block number interval as the migration threshold; and when the block number interval is right-closed, determine the sum of the right endpoint value of the block number interval and an incremental step size of the block number of the blockchain as the migration threshold.

In some embodiments, the migrating module is further configured to: search for a data node stored in the target data storage that has the same node ID as that of the target data node, and the block number in the two-tuple being the largest block number among the block numbers smaller than the migration threshold; and determine whether the block number in the two-tuple of said data node is larger than the block number in the two-tuple of the target data node.

In some embodiments, the apparatus further includes: a storage module configured to determine data nodes having data updates on the state Merkle tree of the latest block; create Key-Value pairs for the data nodes having data updates on the state Merkle tree of the latest block, and store the Key-Value pairs to the highest-level data storage in the database; wherein the key of the Key-Value pair is a two-tuple composed of a block number of the latest block and a node ID of the data node; and the Value of the Key-Value pair is the data content contained in the data node.

In some embodiments, the Merkle tree is a variant of the Merkle tree with a tree structure incorporating a Trie dictionary tree. The node ID of the data node is character prefix corresponding to the path from the root node to the data node of the MPT tree.

In some embodiments, the state Merkle tree is a Merkle Patricia Tree state tree.

In some embodiments, the database is a LevelDB database; or a database based on the LevelDB architecture.

In some embodiments, the database is a Rocksdb database based on a LevelDB architecture.

In some embodiments, the read-write performance of the storage medium corresponding to the multi-level data storage has a difference in performance. The read-write performance of the storage medium corresponding to the high-level data storage is higher than the read-write performance of the storage medium corresponding the low-level data storage.

Through the above technical solutions, pruning of data nodes on the state Merkle tree stored in the database can be achieved. Data nodes that record history state data are removed from the state Merkle tree, and migrated to the lower level of data storage. Data nodes that record the latest state data can be retained to be stored in the current-level of data storage. Therefore, it can achieve the hierarchical storage of the state Merkle tree stored in the database.

DETAILED DESCRIPTION OF THE EXAMPLES

Figure 1:
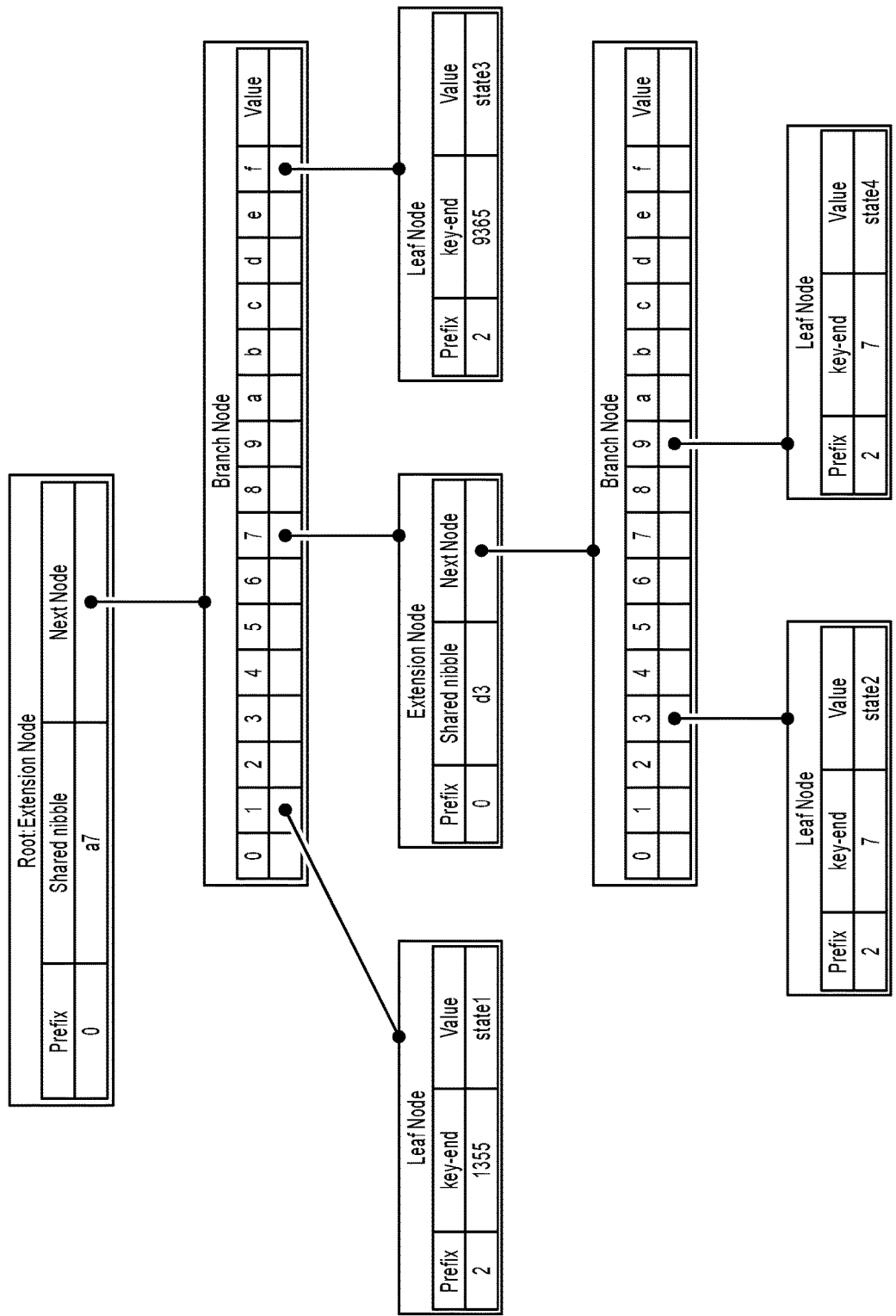
FIG. 1 is a schematic diagram of organizing account state data of a blockchain into an MPT state tree according to an embodiment of the present disclosure.

Some embodiments will be described in detail here, examples of which are illustrated in the accompanying drawings. When the following description refers to the accompanying drawings, the same numerals in different drawings represent the same or similar elements unless otherwise indicated. The implementations described in the following embodiments do not represent all implementations consistent with one or more embodiments of the present disclosure. Rather, they are merely examples of apparatuses and methods consistent with some aspects of one or more embodiments of the present disclosure, as detailed in the appended claims.

It should be noted that, in other embodiments, the steps of the corresponding method are not necessarily performed in the order shown and described in the present disclosure. In some other embodiments, the method may include more or fewer steps than described in the present disclosure. In addition, a single step described in the present disclosure may be divided into multiple steps for description in other embodiments; and multiple steps described in the present disclosure may be combined into a single step for other embodiments.

Blockchains are generally divided into three types: public blockchains, private blockchains, and consortium blockchains. In addition, there can be combinations of the above types, such as private blockchain+consortium blockchain, consortium blockchain+public blockchain, etc. Here, the most decentralized is the public blockchain. The public blockchain is represented by Bitcoin and Ethereum. Participants joining the public blockchain can read data records on the chain, participate in transactions, and compete for the record-keeping right for latest blocks.

Moreover, each participant (i.e. each node) can freely join and leave the network and perform related operations. On the contrary, for the private blockchain, the write permission of the network is controlled by an organization or institution, and the data read permission is regulated by the organization. In simple terms, a private blockchain can be a weakly centralized system with strict restrictions on participating nodes and having a small number of nodes. This type of blockchain is more suitable for internal use by specific institutions.

Based on the basic characteristics of a blockchain, a blockchain is usually composed of several blocks. In each of these blocks, a timestamp corresponding to the creation time of the block is recorded, and the blocks form a time-ordered data chain strictly according to the timestamps recorded in the blocks.

The real data generated by the physical world can be constructed into a standard transaction format supported by the blockchain, and then posted to the blockchain, and the node devices in the blockchain will perform consensus processing on it. After reaching a consensus, the transaction will be packaged into a block by the node device that acts as a record-keeping node in the blockchain, and the certificate will be persisted in the blockchain.

In the field of blockchain, there is a concept: account. Taking Ethereum as an example, accounts are divided into two types: external accounts and contract accounts. An external account is an account directly controlled by a user; and a contract account is an account containing contract codes (that is, smart contracts) which is created by a user through an external account.

However, for some blockchain projects (such as the ant blockchain) derived from the Ethereum-based architecture, the account types supported by the blockchain can be further expanded, which is not specifically limited in this description.

For an account in the blockchain, a structure is usually used to maintain the account state of the account. When a transaction in a block is executed, the state of the account associated with the transaction in the blockchain usually also changes.

Taking Ethereum as an example, the structure of an account usually includes fields such as Balance, Nonce, Code, and Storage.

The Balance field is configured to maintain the current account balance of the account.

The Nonce field is configured to maintain the number of transactions for this account; and it is a counter used to ensure that each transaction can be processed once, effectively avoiding replay attacks.

The Code field is configured to maintain the contract codes of the account. In actual application, the Code field usually maintains the hash value of the contract codes; therefore, the Code field is also commonly called the Codehash field. For external accounts, this field is null.

The Storage field is configured to maintain the storage content of the account (the field value is null by default). In actual application, the Storage field maintains the root node of the MPT (Merkle Patricia Trie) tree constructed based on the storage content of the account; therefore, the Storage field is also commonly called the StorageRoot field.

For an external account, the field values of the Code field and the Storage field are both nulls.

For most blockchain projects, Merkle trees are usually used; or, data structures based on Merkle trees are used to store and maintain data. Take Ethereum as an example. Ethereum uses the MPT tree (a variant of Merkle tree) as a data organization form to organize and manage data such as account states and transaction information.

For data to be stored and maintained in the blockchain, Ethereum designed three MPT trees, which are an MPT state tree, an MPT transaction tree, and an MPT receipt tree.

The MPT state tree is an MPT tree formed by the account state data of accounts in the blockchain. The MPT transaction tree is an MPT tree formed by transaction data in the block. The MPT receipt tree is an MPT tree formed by transaction receipts respectively corresponding to the transactions in the block generated after the execution of the transaction in the block is completed. The hash values of the root nodes of the MPT state tree, the MPT transaction tree, and the MPT receipt tree will eventually be added to the block header.

Here, the MPT transaction tree and the MPT receipt tree correspond to a block, that is, each block has its own MPT transaction tree and MPT receipt tree. The MPT state tree is a global MPT tree, which does not correspond to a specific block, but covers the account state data of accounts in the blockchain.

The organized MPT transaction tree, MPT receipt tree, and MPT state tree are eventually stored in a Key-Value database (such as LevelDB) that adopting a multi-level data storage structure.

The database adopting a multi-level storage structure can be divided into n-level data storages. For example, the data storage at each level can be set to L0, L1, L2, L3, ... L (n-1) in that order. For each level of data storage in the database, the smaller the level number is, the higher the level is. For example, L0 stores the latest data of several blocks, and L1 stores the second latest data of several blocks, and so on.

Here, the reading and writing performance of the storage medium corresponding to the data storage at each level may also have performance differences. The reading and writing performance of the storage medium corresponding to a high-level (that is, with a small level number) data storage may be higher than the reading and writing performance of the storage medium corresponding to a low-level (that is, with a large level number) data storage.

For example, in actual application, high-level data storage can use storage medium with higher writing and reading performance. While lower-level data storage can use storage medium with lower unit cost and larger capacity.

In an implementation, as the block height of the blockchain increases, the data stored in the database will contain a lot of history data. Moreover, the smaller the block number is, the older the data in the block is and the less frequently accessed the data is. Therefore, in order to reduce the overall storage cost, data of different block heights usually can be "treated differently".

For example, data in blocks with smaller block numbers can be stored on lower-cost storage media; data in blocks with larger block numbers can be stored higher-cost storage media.

When data such as the MPT transaction tree, the MPT receipt tree, and the MPT state tree stored in the database is hierarchically stored, the MPT transaction tree and the MPT receipt tree correspond to each block, which is actually "unrelated between blocks" data. Therefore, for the MPT transaction tree and the MPT receipt tree, it is easy to perform hierarchical storage. For example, the data can be migrated directly according to the block number of the node on the MPT transaction tree and the MPT receipt tree to complete the hierarchical storage.

Based on this, the present disclosure will not specifically explain the hierarchical storage of the MPT transaction tree and the MPT receipt tree, but focus on the hierarchical storage of the MPT state tree.

Referring to FIG. 1, which is a schematic diagram of organizing account state data of a blockchain into an MPT state tree.

An MPT tree is an improved Merkle tree variant, which combines advantages of Merkle tree and Trie dictionary tree (also called prefix tree).

There are usually three types of data nodes in the MPT tree, which are respectively leaf nodes, extension nodes and branch nodes.

A leaf node is a key-value pair expressed as [key, value], where the key is a special hexadecimal code.

An extension node is also a key-value pair [key, value], but the value is a hash value (hash pointer) of other nodes. In other words, other node can be linked through the hash pointer link.

For a branch node, since the key in the MPT tree is encoded into a special hexadecimal representation, plus a final value, the branch node is a list of a length of 17, in which the first 16 elements correspond to the 16 possible hexadecimal characters of the key (one character corresponds to one nibble). If there is a [key, value] pair terminated at this branch node, the last element represents the value of value, that is, the branch node can be either a termination of a search path or an intermediate node of a path.

Assuming that the account state data that can be organized into an MTP state tree is shown in Table 1 below:

TABLE 1

| Account Address (Key) | | | | | | | Account State (Value) |
|---|---|---|---|---|---|---|---|
| a | 7 | 1 | 1 | 3 | 5 | 5 | state1 |
| a | 7 | 7 | d | 3 | 3 | 7 | state2 |
| a | 7 | f | 9 | 3 | 6 | 5 | state3 |
| a | 7 | 7 | d | 3 | 9 | 7 | state4 |

In Table 1, the account address is a string of hexadecimal characters. The account state is a structure composed of the fields such as Balance, Nonce, Code, and Storage.

Finally, the MPT state tree organized according to the account state data in Table 1 is shown in FIG. 1. As shown in FIG. 1, the MPT state tree formed by the account state data in Table 1 is composed of 4 leaf nodes, 2 branch nodes, and 2 extension nodes.

In FIG. 1, the prefix field is a prefix field shared by the extension node and the leaf node. In an implementation, field values of the prefix filed can be used to represent the type of the node.

The value of the prefix field being 0 indicates an extension node containing an even number of nibbles. As mentioned earlier, a nibble represents half of a byte, consisting of 4-bit binary, and a nibble can correspond to a character that constitutes an account address.

The value of the prefix field being 1 indicates an extension node containing an odd number of nibble(s).

The value of the prefix field being 2 indicates a leaf node containing an even number of nibbles.

The value of the prefix field being 3 indicates a leaf node containing an odd number of nibble(s).

For a branch node, since it is a prefix node of single nibbles in parallel, the branch node does not have the prefix field described above.

A Shared nibble field in an extension node corresponds to the key value of the key-value pair contained in the extension node, which represents a common character prefix between account addresses. For example, account addresses in the table above have a common character prefix a7. The Next Node field is filled with a hash value (a hash pointer) of the next node.

The hexadecimal character 0~f field in the branch node corresponds to the key value of the key-value pair contained in the branch node. If the branch node is an intermediate node on the search path of the account address on the MPT tree, the Value field of the branch node can be null. The 0~f field is used to fill the hash value of the next node.

The key-end in the leaf node corresponds to the key value of the key-value pair contained in the leaf node, and represents the last few characters of the account address. The key value of each node on the search path from the root node to the leaf node constitutes a complete account address. The Value field of the leaf node is filled with account state data corresponding to the account address. For example, the structure formed by the above fields such as Balance, Nonce, Code, and storage may be encoded and then filled into the Value field of the leaf node.

Further, the nodes on the MPT state tree shown in FIG. 1 are finally stored in the database in the form of key-value pairs Key-Value.

Here, when a node on the MPT state tree is stored in the database, the key in the key-value pair of the node on the MPT state tree can be the hash value of the data content contained in the node. The Value in the key-value pair of the node on the MPT state tree is the data content contained in node.

That is, when a node on the MPT state tree is stored in the database, a hash value of the data content contained in the node can be calculated (that is, a hash value is calculated with respect to the entire node), and the calculated hash value can be used as a key. The data content contained in node is used as value to generate a key-value pair Key-Value. Then, the generated key-value pair Key-Value is stored in the database.

Since the node on the MPT state tree is based on the hash value of the data content contained in the node as the Key and the data content contained in the node which is stored as the value, when a node on the MPT state tree is searched for, the hash value of the data content contained in the node can generally be used as a key for content addressing. When content addressing is employed, nodes with "duplicate content" can usually be "reused" to save storage space for storing data.

Figure 2A:
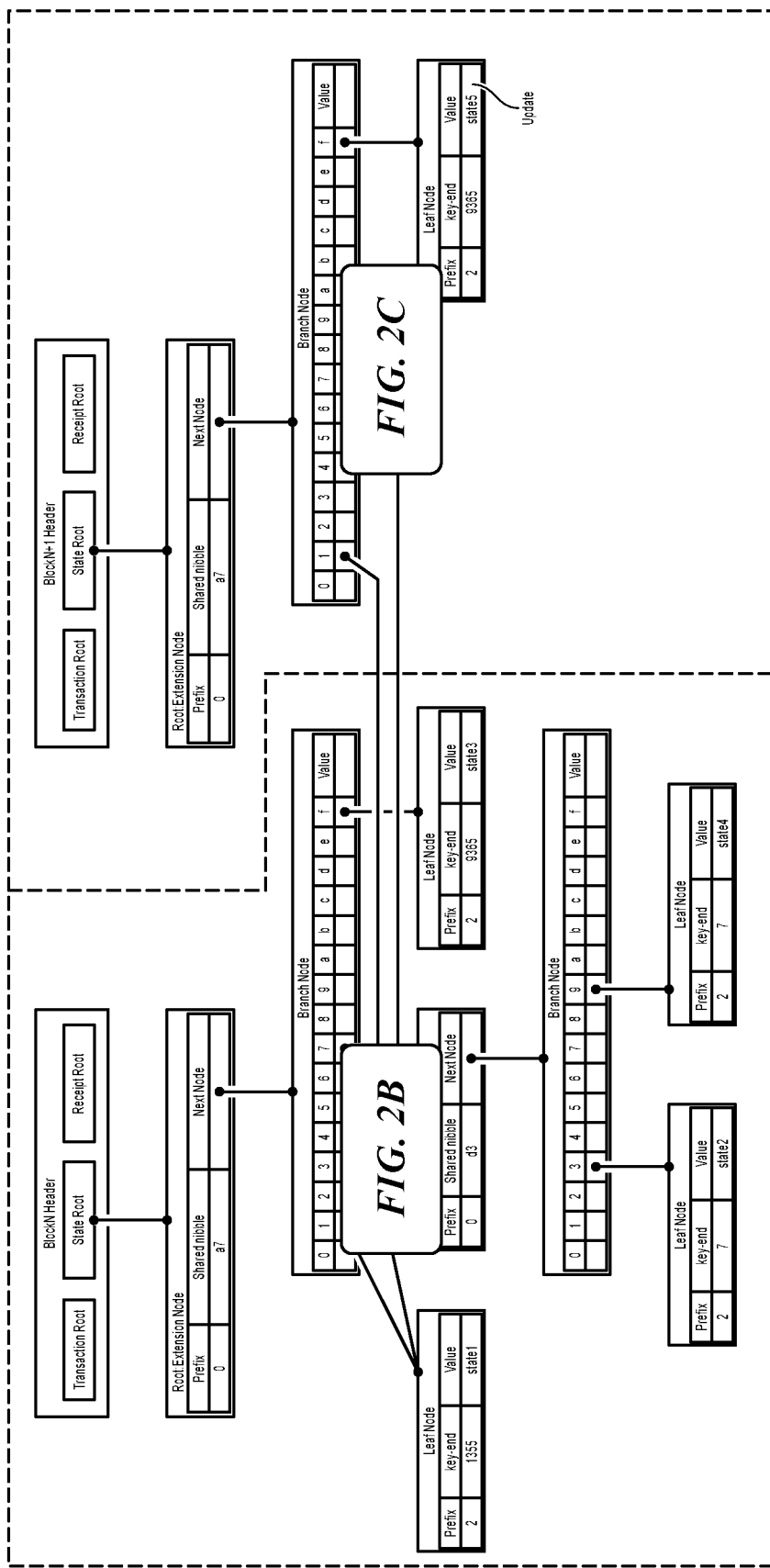
FIGS. 2A-2C represent a schematic diagram of reusing nodes on an MPT state tree according to an embodiment of the present disclosure.
Figure 2B:
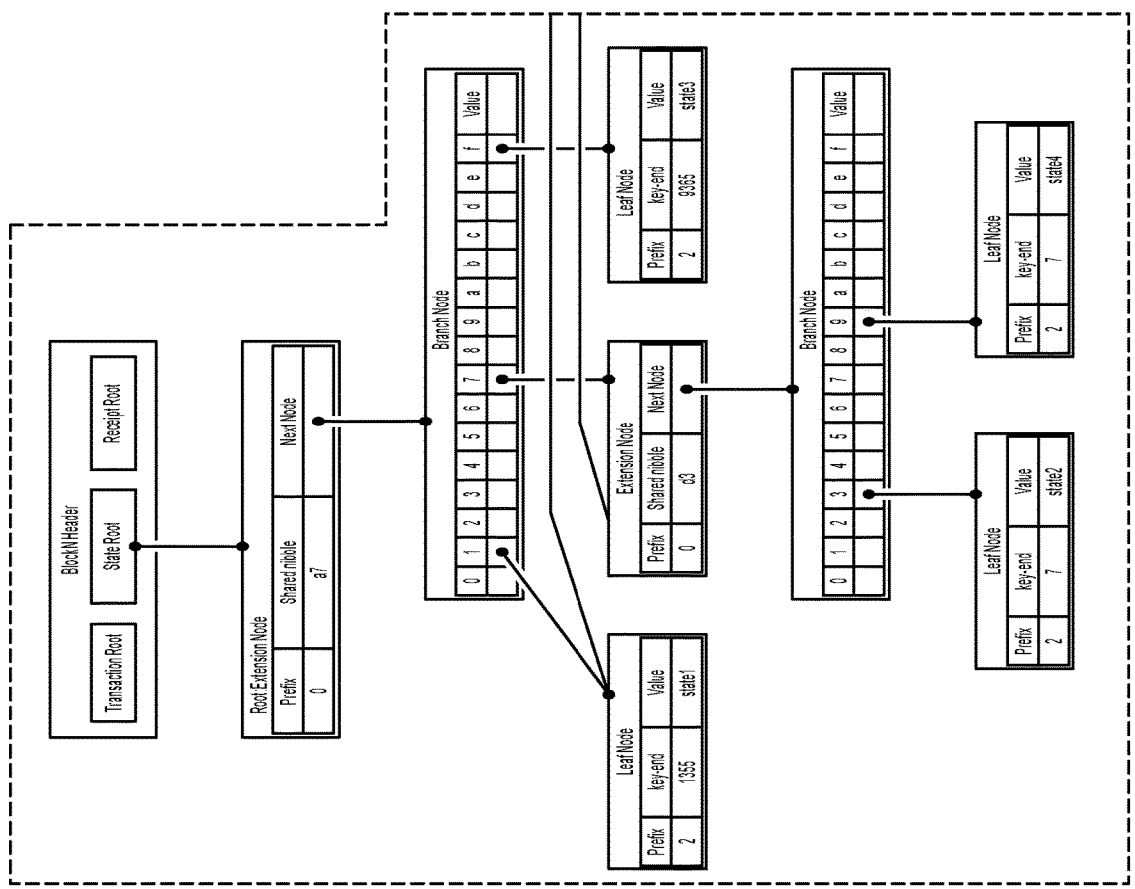
Figure 2C:
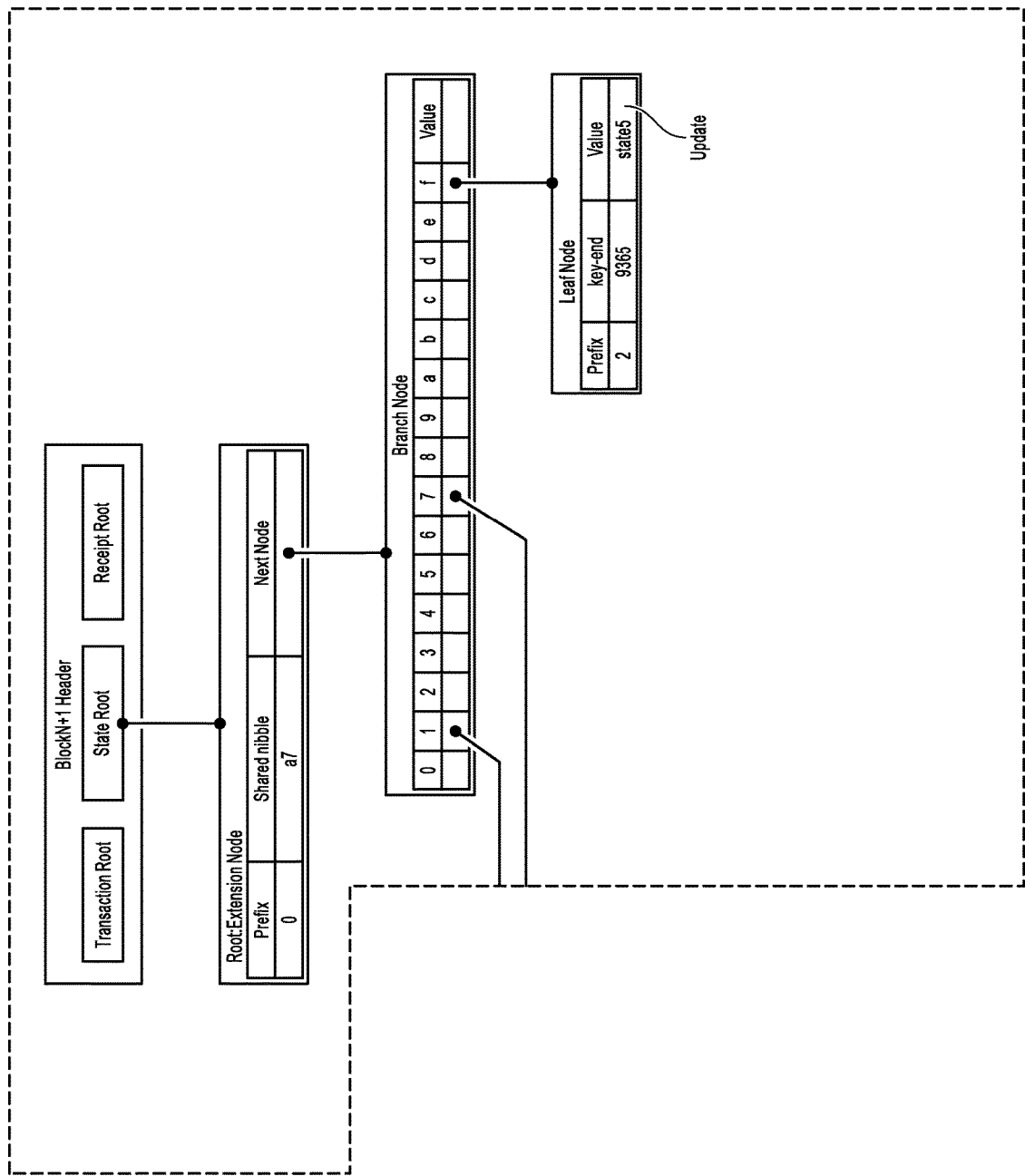

FIGS. 2A-2C represent a schematic diagram of reusing nodes on an MPT state tree shown in the present disclosure.

In an implementation, whenever a latest block is generated by the blockchain, after the transactions in the latest block are executed, the account states of the accounts associated with these executed transactions in the blockchain usually changes with it.

For example, after a "transfer transaction" in the block is completed, the balance of the transfer account and the transferee account related to the "transfer transaction" (that is, the value of the Balance field of these accounts), usually change with it.

After the transactions in the latest block generated by the blockchain are executed, since the account states in the current blockchain have changed, the node device can build an MPT tree to maintain the latest states of accounts in the blockchain, according to the current account state data of the accounts in the blockchain.

That is, whenever a latest block is generated in the blockchain and the transactions in the latest block are completed, to cause the account states in the blockchain to change, and the node device needs to rebuild an MPT tree based on the latest account state data of all accounts in the blockchain.

In other words, each block in the blockchain has a corresponding MPT state tree; the MPT state tree maintains the latest account states of the accounts in the blockchain after the transactions in the block are completed.

It should be noted that, after execution of the transaction in the latest block generated by the blockchain is completed, it may cause the account states of some accounts to change. Therefore, when updating the MPT state tree, a complete MPT state tree may not be rebuilt based on the current state data of accounts in the blockchain. Instead, the nodes corresponding to the some accounts of which account states have changed can be updated based on the MPT state tree corresponding to the blocks before the latest block. For the nodes on the MPT state tree that correspond to the accounts of which account states have not changed, since no data updates have occurred on these nodes, the nodes on the MPT state tree corresponding to the blocks before the latest block can be readily reused.

As shown in FIGS. 2A-2C, it is assumed that the account state data in Table 1 is the latest account states of accounts on the blockchain after execution of the transaction in Block N is completed, and the MPT state tree organized based on the account state data in Table 1 is still as shown in FIG. 1.

Assuming that after execution of the transaction in Block N+1 is completed, the account state of the account address "a7f9365" in Table 1 is updated from "state3" to "state5". At this time, when the Block N+1 updates the MPT state tree, an MPT state tree may not be rebuilt based on the current state data of the accounts in the blockchain after execution of the transactions in Block N+1 is completed.

Referring to FIGS. 2A-2C, in this case, the value in the leaf node with the key-end being "9365" on the MPT tree corresponding to Block N (that is, the MPT state tree shown in FIG. 1) can be updated from "state3" to "state5", and continue to update the hash pointers of nodes on the path from the root node to the leaf node. That is, when a leaf node on the MPT state tree is updated, as the hash value of the entire leaf node is updated, the hash pointers of nodes on the path from the root node to the leaf node are also updated accordingly. For example, still referring to FIGS. 2A-2C, in addition to updating the value of Value field in a leaf node with a "key-end" of "9365", the hash pointer pointing to the leaf node which is filled in the f field of the previous branch node of the leaf node can be updated. Further, it is possible to continue to trace back to the root node and continue to update the hash pointer pointing to the branch node which is filled in the "Next Node" field in the previous root node (Root Extension Node) of the branch node.

In addition to the nodes that have been updated above, other nodes that have not been updated can directly reuse the corresponding nodes on the MPT state tree of Block N;

Here, the MPT tree corresponding to Block N can be retained as history data. Therefore, when the MPT state tree is updated by Block N+1, these updated nodes are not modified and updated directly on the original nodes on the MPT state tree corresponding to Block N, but these updated nodes are recreated on the MPT tree corresponding to Block N+1.

That is, on the MPT state tree corresponding to Block N+1, a small number of nodes that can be updated are actually recreated. For other nodes that have not been updated, the corresponding nodes on the MPT state tree corresponding to Block N can be directly reused.

For example, as shown in FIGS. 2A-2C, for the MPT state tree corresponding to Block N+1, a few nodes that have been updated can be recreated. For example, in FIGS. 2A-2C, an expansion node as a root node, a branch node, and a leaf node can be recreated. For the nodes that have not been updated, by adding hash pointers pointing to the corresponding nodes on the MPT state tree corresponding to Block N to these recreated nodes on the MPT state tree to complete the "reusing" of the nodes. The nodes before the update on the MPT state tree corresponding to Block N will be saved as history account state data. For example, the leaf node with "key-end" of "9365" and Value of "state3" shown in FIGS. 2A-2C will be retained as history data. In the above example, a few nodes on the MPT state tree of Block N+1 are updated their content, so that most nodes of the previous block Block N can be "reused" as an example. In an implementation, the MPT state tree of Block N+1 may also be added with a node compared to that of the previous block Block N.

In this case, although the newly added node cannot be "reused" directly from the MPT tree of the previous block Block N, it may be "reused" from the MPT state tree of an earlier block.

For example, although the newly added node on the MPT state tree of Block N+1 is not on the MPT state tree of Block N, the node may appear on the MPT state tree of an earlier block, for example, on the MPT state tree of Block N-1. Therefore, the newly added node on the MPT state tree of Block N+1 can directly reuse the corresponding node on the MPT state tree of Block N-1.

It can be seen that there are two types of "reusing" implementations in an MPT state tree.

In one implementation, if a small number of nodes on the MPT state tree of a block have updated content, they can "reuse" most of the nodes of the previous block.

In another implementation, if the MPT state tree of a block has newly added nodes compared to the MPT state tree of the previous block, the corresponding nodes on the MPT state tree of the earlier block can be "reused".

However, through node reuse, although the storage space of the database can be saved, due to the complex reusing relationship between the nodes on the MPT state trees of the blocks, the nodes on the MPT state tree of each block may be reused by the next block, or by several consecutive blocks after the next block. Therefore, such complex node reusing relationship will inevitably cause difficulties in hierarchical storage of the MPT state tree.

For example, when some nodes are used as history data and migrated from the current level of data storage to the next level of data storage, these nodes may be reused by the next block, or even by several blocks after the next block. And which nodes will reuse these nodes may not be accurately predicted. Therefore, the nodes on the MPT state tree stored in the database may not be accurately pruned. Here, the pruning refers to clearing the reusing relationship between the nodes on the MPT state trees of the blocks, removing the nodes that have recorded history state data from the MPT state tree, and/or keeping the nodes that have recorded the latest state data. In this case, the demand for hierarchical storage may not be met.

Based on this, the present disclosure proposes a hierarchical storage method for a state Merkle tree formed of account state data of a blockchain.

In an implementation, the account state data of the blockchain can still be organized into a state Merkle tree. Then, the data nodes on the state Merkle tree are stored in a database with a multi-level data storage structure in the form of key-value pairs Key-Value. For example, the data structure of the MPT tree can still be used to organize blockchain account state data into an MPT state tree. For each node on the state Merkle tree stored in the database in the form of key-value pairs, each node can be labeled with a block number in the key of the key-value pair corresponding to the node. The block number is used to indicate the block number of the block where the node was located when the node had data update.

For example, in an implementation, after the execution of the transaction in the latest block generated by the blockchain is completed, nodes having data updates on the state Merkle tree of the latest block can be determined based on the execution result of the transactions in the latest block. Nodes having data updates usually include nodes having the values of value updated and newly added nodes. After determining the nodes having data updates on the state Merkle tree of the latest block, these nodes having data updates can be labeled, in the keys of the key-value pairs corresponding to these nodes, with the block number of the latest block, which indicates that the nodes have data updates in the block corresponding to the block number.

When a data node on the state Merkle tree is stored in the database in the form of a key-value pair Key-Value, the key of the key-value pair Key-Value may no longer take the hash value of the content contained in the data node, but take a two-tuple consisting of a node ID of the data node and the block number that can indicate the block where the data node is when the data node has data update.

Further, when target data storage of any level in the database meets a data migration condition, for example, the target data storage has a storage capacity reaches a threshold, it is determined a block number interval corresponding to the data nodes in the target data storage that are to be migrated to the lower level data storage. A migration threshold is determined based on the block number interval, wherein the migration threshold is a block number threshold larger than the block number interval.

For example, in one implementation, if the block number interval is right-opened, the right endpoint value of the block number interval is determined as the migration threshold. For example, assuming that the block number interval is [a, b), then b is determined as the migration threshold. If the block number interval is right-closed, the sum of the right endpoint value of the block number interval and an incremental step size of the block number of the blockchain is determined as the migration threshold. For example, assuming that the block number interval is [a, b], the incremental step size of the block number of the blockchain is 1 (that is, the block number in the blockchain is densely incremented by 1), then b+1 is determined as the migration threshold.

After the migration threshold is determined, the two-tuples of data nodes stored in the target data storage are iteratively traversed, to search for a target data node having a block number in the two-tuple smaller than the migration threshold.

After a target data node is searched out, according to the two-tuple of the target data node, addressing in the target data storage is further performed, to check whether in the target data storage there stores a data node having the same node ID as that of the target data node and the block number in the two-tuple larger than that of the target data node and smaller than the migration threshold.

If so, the target data node can be migrated to the lower level data storage of the target data storage. For example, the target data node searched out is written to the lower level data storage of the target data storage. After the write succeeds, the target data node is cleared from the target data storage. Otherwise, the target data node may be retained in the target data storage.

Through the above technical solutions, precise pruning of nodes on the state Merkle tree stored in the database can be achieved. Nodes that record history state data are removed from the state Merkle tree, and migrated to the lower level of data storage. Nodes that record the latest state data can be remained to be stored in the current-level of data storage. Therefore, it can achieve the hierarchical storage of the state Merkle tree stored in the database.

Figure 3:
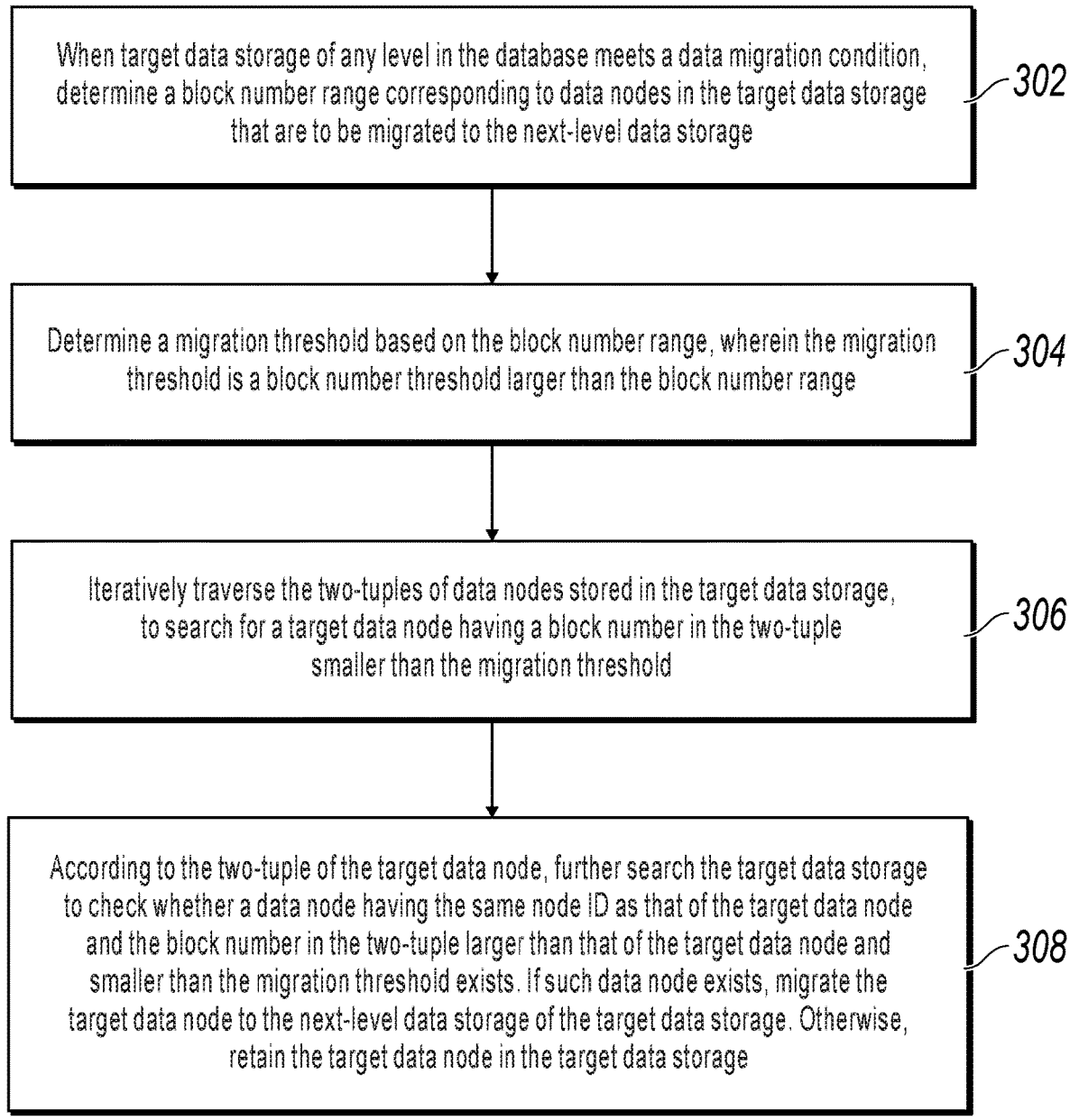
FIG. 3 is a flowchart of a blockchain-based hierarchical storage method according to an embodiment of the present disclosure.

FIG. 3 is a flowchart of a blockchain-based hierarchical storage method according to an embodiment of the present disclosure. The method is applied to a blockchain node device. The data nodes on the state Merkle tree formed by the account state data of the blockchain are stored in the database in the form of key-value pairs Key-Value. A key of a key-value pair Key-Value is a two-tuple composed of a node ID of a data node and a block number labelled for the data node. The database includes multi-level data storage. The block number indicates the block where the data node is located when the data node has data update. In some embodiments, the method includes the following steps.

At step 302, when target data storage of any level in the database meets a data migration condition, it is determined a block number interval corresponding to data nodes in a target data storage that are to be migrated to the lower level data storage.

At step 304, a migration threshold is determined based on the block number interval, wherein the migration threshold is a block number threshold larger than the block number interval.

At step 306, the two-tuples of data nodes stored in the target data storage are iteratively traversed, to search for a target data node having a block number in the two-tuple smaller than the migration threshold.

At step 308, according to the two-tuple of the target data node, the target data storage is further searched to check whether a data node having the same node ID as that of the target data node and the block number in the two-tuple larger than that of the target data node and smaller than the migration threshold exists. If such data node exists, the target data node can be migrated to the lower level data storage of the target data storage. Otherwise, the target data node is retained in the target data storage.

The database may be a Key-Value type database that has a multi-level data storage structure for storage. For example, in one illustrated implementation, the database may be a LevelDB database, or a database based on a LevelDB architecture. For example, a Rocksdb database is a typical database based on the LevelDB database architecture.

The account state data in the blockchain can be organized into the data structure of the state Merkle tree and stored in the database. For example, the state Merkle tree can be an MPT tree, and a data structure of an MPT tree can be used to organize the account state data of the blockchain into an MPT state tree.

The following uses the data structure of the MPT tree to organize the account state data in the blockchain into an MPT state tree as an example to describe the technical solution of the present disclosure in detail.

It should be emphasized that using the data structure of the MPT tree to organize account state data in the blockchain is exemplary.

In an implementation, for blockchain projects based on the Ethereum architecture, in addition to the improved Merkle tree such as the MPT tree, it is also possible to use other forms of Merkle tree variants similar to the MPT tree and incorporating the tree structure of the Trie dictionary tree, which will not be listed one by one in the present disclosure.

In some embodiments of the present disclosure, a user client accessing the blockchain can package data into a standard transaction format supported by the blockchain, and then post it to the blockchain. The node devices in the blockchain can cooperate with other node devices to achieve consensus on these transactions posted by the user client to the blockchain based on the installed consensus algorithm to generate the latest blocks for the blockchain.

The consensus algorithms supported in the blockchain are generally divided into consensus algorithms in which node devices have to compete for the record-keeping right of each round of record-keeping cycle, and consensus algorithms in which record-keeping nodes are elected previously for each round of record-keeping cycle (no need to compete for the record-keeping right).

For example, the former is represented by consensus algorithms such as Proof of Work (POW), Proof of Stake (POS), and Delegated Proof of Stake (DPOS). The latter is represented by Practical Byzantine Fault Tolerance (PBFT) and other consensus algorithms.

For a blockchain network employing consensus algorithms such as Proof of Work (POW), Proof of Stake (POS), and Delegated Proof of Stake (DPOS) and other consensus algorithms, node devices that compete for the record-keeping right can execute a transaction upon receiving the transaction. One of the node devices competing for the record-keeping right may win in the current round of contention for the record-keeping right and become the record-keeping node. The record-keeping node can package the received transaction with other transactions to generate the latest block, and send the generated latest block to other node devices for consensus.

In the blockchain network employing the consensus algorithm such as Practical Byzantine Fault Tolerance (PBFT), the node device having the record-keeping right has been agreed on before the current round of record-keeping. Therefore, upon receiving a transaction, a node device, if the node device is not the record-keeping node of the current round, can send the transaction to the record-keeping node.

The record-keeping node of the current round can execute the transaction during or before the transaction is packaged with other transactions to generate the latest block. After the record-keeping node packages the transaction and other transactions to generate the latest block, the record-keeping node can send the generated latest block or the block header of the latest block to other node devices for consensus.

As mentioned above, no matter which consensus algorithm is adopted by the blockchain, the record-keeping node of the current round can package the received transaction to generate the latest block, and the generated latest block or the block header of the latest block is sent to other node devices for consensus verification. If other node devices receive the latest block or the block header of the latest block, and it is verified that there is no problem, the latest block can be added to the end of the original blockchain to complete the record-keeping process of the blockchain.

In some embodiments of the present disclosure, after the node devices in the blockchain perform the transactions packaged in the latest block generated by consensus, the account state related to these executed transactions in the blockchain will usually change accordingly. Therefore, after the node devices perform the packaged transactions in the latest block, the node devices can organize a data structure of an MPT state tree according to the latest account state data of accounts in the blockchain.

Here, when according to the latest account state data of the accounts in the blockchain, organizing an MPT state tree, the method of reusing nodes on the MPT tree corresponding to the block before the latest block as shown in FIGS. 2A-2C can still be used, which will not be repeated in the present disclosure.

When the node device organizes the MPT state tree according to the latest account state data of the accounts in the blockchain, the node device can store the data nodes on the MPT state tree in the form of key-value pairs Key-Value in a Key-Value database with a multi-level data storage structure.

For example, in an implementation, the data nodes on the MPT state trees corresponding to some latest blocks may be stored by default in the highest level L0 data storage in the database. The data nodes on the MPT state trees corresponding to some second latest blocks may be stored in the second highest level L1 data storage in the database, and so on. Here, the number of blocks corresponding to the MPT state tree stored in each level of data storage is not specifically limited in the present disclosure. For example, the highest level L0 of data storage may be specified to store the MPT state trees of N latest blocks, and the second highest level L1 of data storage may be specified to store the MPT state tree of the N second latest blocks, and so on.

In some embodiments of the present disclosure, a data node on the constructed MPT state tree can be labeled with a block number. The block number labeled for the data node on the MPT state tree is used to indicate the block where the data node is located when the data node has data update.

For example, as shown in FIGS. 2A-2C, taking the node having data update on the MPT state tree corresponding to Block N+1 as an example, the block number labeled for these nodes is N+1, to indicate that these nodes have data updates after the execution of the transactions in Block N+1 are completed.

In an implementation, the node device can start a "block state update thread" locally to maintain and update the state of the node on the MPT state tree. After the execution of the transaction in the latest block generated by the blockchain is completed, the "block state update thread" can determine the nodes having data updates on the MPT state tree corresponding to the latest block. The nodes having data updates usually include nodes having the values of value updated and newly added nodes.

For example, in an implementation, a node having data update on the MPT state tree corresponding to the latest block can be determined according to the execution result of the transactions in the latest block. A node having data update on the MPT state tree corresponding to the latest block can also be determined by determining whether it is a reused node. For example, if it is a reused node, it indicates that the node is a node having no data update.

After determining the nodes having data updates on the MPT state tree corresponding to the latest block, the "block state update thread" can label the nodes having data updates with the block number of the latest block, to indicate that the these nodes have data updates in the block corresponding to the block number.

In this way, whenever a latest block is generated by the blockchain, the "block state update thread" can promptly label the nodes having data updates on the MPT state tree corresponding to the latest block with the block number of the latest block. As such, by traversing each node on the MPT state tree stored in the database, from the block number labeled for the node, the block where the node was located when the node had data update can be known. Since the value of value of each node on the MPT state tree (especially the leaf node on the MPT tree) after the latest data update can usually indicate the latest state of the node, by checking the block number of each node, in which block the latest state of each node is generated can be known. Therefore, this mechanism for labelling the block number for the node can provide a basis for the data migration of the data storage at all levels of the database.

In the present disclosure, the "block state update thread" may label the node on the MPT state tree in the key of the key-value pair Key-Value corresponding to the node on the MPT state tree, with the block number.

After determining the nodes having data updates on the MPT state tree corresponding to the latest block, the "block state update thread" can construct key-value pairs Key-Value for these nodes having data updates, and then label each of the nodes with a block number in the key of the constructed key-value pair Key-Value, and store the constructed key-value pairs in the database.

When a data node on the state Merkle tree is stored in the database in the form of a key-value pair Key-Value, the key of the key-value pair Key-Value may no longer take the hash value of the content contained in the data node, but take a two-tuple consisting of a node ID of the data node and the block number that can indicate the block where the data node is when the data node has data update. The Value of the Key-Value key-value pair can still be the data content contained in the data node. For example, the two-tuple can be recorded as [nid, h], where nid represents NodeID; and h represents the block number labelled for the node.

That is, in some embodiments, the present disclosure, the hash value of the data content contained in the data node may no longer be used as the key of the data node. Instead, a two-tuple consisting of a node ID of the data node and a block number that can indicate the block where the data node is when the data node has data update.

In this way, the addressing method used by the database will also change. For the database, the hash value of the data content contained in node may no longer be used as the key for content addressing. Instead, the node ID and the block number of the block where the data node is when the data node has data update will be used for addressing.

It should be noted that the node ID of the data node specifically refers to the unique identifier of the data node in the MPT state tree.

For example, in an implementation, for a Merkle tree variant with a tree structure incorporating a Trie dictionary tree, such as the MPT tree, usually character prefix corresponding to the path from the root node to the data node of the MPT tree are used. For example, for any leaf node shown in FIG. 1 and FIGS. 2A-2C, the character prefix corresponding to the path from the root node to the leaf node is usually the account address corresponding to the leaf node. That is, the node ID of the leaf node on the MPT tree is the account address corresponding to the leaf node.

However, in an implementation, in addition to using the character prefix corresponding to the path from the root node to the data node of the MPT tree as the node ID of the data node, the node ID of the data node may also be a node number set when the MPT tree is constructed, which can uniquely distinguish each data node. This is not particularly limited in the present disclosure.

In some embodiments of the present disclosure, the node device may also start a "migration thread" locally for migrating the node data on the MPT state tree stored in the data storage at each level in the database to the lower-level of data storage.

The "migration thread" may execute a scheduled task, and may periodically determine whether the data storage of each level in the database meets a preset data migration condition.

The data migration condition of the data storage of each level in the database can be set based on actual data migration requirements, which will not be particularly limited in the present disclosure.

For example, in an implementation, the data migration condition of the data storage at each level of the database may be that a storage capacity of the data storage at each level reaches a threshold. It may also be that a number of blocks corresponding to the data stored in the data storage at each level reaches a threshold.

When the "migration thread" determines that the target data storage at any level in the database satisfies the data migration condition, the "migration thread" can perform data migration processing on the target data storage, and migrate part of the MPT state trees of the blocks stored in the target data storage to the lower level data storage as history data.

In an implementation, when the target data storage meets the data migration condition, the "migration thread" can determine the block number interval corresponding to the node in the target data storage that can be migrated to the lower level data storage.

The block number interval corresponding to the node in the target data storage that can be migrated to the lower level data storage can be determined based on the block number of the next block after the previous data migration, and the maximum number of blocks that can be migrated from the target data storage at one time. For example, assuming that the next block after the previous data migration is Block N, and the number of blocks that can be migrated from the target data storage at one time is 30, the block number interval can be [N, N+29]; or [N, N+30).

When the "migration thread" determines the block number interval corresponding to the node in the target data storage that can be migrated to the lower level data storage, the "migration thread" can determine the migration threshold for this data migration based on the block number interval, where the migration threshold can be a value larger than the block number threshold of the block number interval.

It should be noted that, in an implementation, the block number interval may be right-opened or right-closed. When the migration threshold is determined based on the block number interval, the migration threshold may have a certain difference whether the block number interval is right-opened or right-closed.

In an illustrated implementation, if the block number interval is right-opened, when determining the migration threshold based on the block number interval, the right endpoint value of the block number interval may be determined as the migration threshold.

For example, assuming that the block number interval is [a, b), the migration threshold determined based on the block number interval is the right endpoint value b of the block number interval.

In another illustrated implementation, if the block number interval is right-closed, when determining the migration threshold based on the block number interval, the sum of the right endpoint value of the block number interval and an incremental step size of the block number of the blockchain is determined as the migration threshold.

For example, assuming that the block number interval is [a, b], and the block number incremental step size of the blockchain is 1, then the migration threshold determined based on the block number interval is the right endpoint value of the block number interval b+1.

Wherein, the step number of the blockchain is usually incremented by 1, that is, the block number of the blockchain is densely incremented by 1 as a step size. For example, the block number is incremented as 1, 2, 3, 4 . . . sequentially.

However, in an implementation, the incremental step size of the block number of the blockchain can also be an integer larger than 1. For example, the block number can also be incremented as 1, 3, 5, 7, . . . sequentially, which is not particularly limited in the present disclosure.

Further, after the "migration thread" determines a migration threshold for the current data migration based on the block number interval, the "migration thread" migrates the MPT state trees of the blocks corresponding to the block number interval stored in the target data storage to the lower level data storage as history data.

In some embodiments, the "migration thread" may first iteratively traverse the keys of the data nodes stored in the target data storage, that is, iteratively traverse the two-tuples consisting of the node IDs and the block numbers labelled of the nodes stored in the target data storage, to search for a target data node having a block number in the two-tuple smaller than the migration threshold, from the nodes stored in the target data storage.

After a target data node having a block number in the two-tuple smaller than the migration threshold is searched out, the "migration thread" can, according to the two-tuple of the target data node, further perform addressing in the target data storage, to check whether in the target data storage there stores a data node having the same node ID (that is, having the same character prefix) as that of the target data node and the block number in the two-tuple larger than that of the target data node and smaller than the migration threshold.

If such data node exists, it indicates that the account state represented by the target node is not the latest account state. At this time, the target node can be used as history data migrated to the lower level data storage of the target data storage. The "migration thread" can migrate the target data node searched out to the lower level data storage of the target data storage.

For example, in implementation, the "migration thread" may copy the target node, store the copied target node to the lower level data storage, and then after the copied target node is successfully stored to the lower level data storage, the target node is cleared from the target data storage.

Conversely, if no such data node exists, it indicates that the account state represented by the target node is the latest account state. In this case, the target node will continue to be retained in the target data storage.

For example, assuming that the block number interval is [a, b), the migration threshold determined based on the block number interval is the right endpoint value b of the block number interval. In this case, it is assumed that the "migration thread" searches out a nodeA in the target data storage, and the two-tuple of nodeA is (nid, i), where i<b. The "migration thread" can address based on the two-tuple (nid, i), to further check whether in the target data storage there stores a nodeB having a two-tuple (nid, j), where b>j>i. If nodeB exists, nodeA can be migrated to the lower level data storage of the target data storage. Otherwise, the nodeA is continued to be retained in the target data storage.

The "migration thread" can iteratively traverse the two-tuples of data nodes stored in the target data storage and iteratively execute the migration process. Eventually, it can retain a node corresponding to the largest block number among block numbers in the two-tuples which are smaller than the migration threshold. Other nodes than this node will be migrated to the lower level data storage as history data.

Since the node stored in the target data storage corresponding to the largest block number among block numbers in the two-tuples which are smaller than the migration threshold usually represents the latest state of the node after the latest update. In this way, it can retain the latest state of each node in the target data storage.

It should be noted that, since in the present disclosure, the key of the Value key-value pair of each node on the MPT state tree is no longer the hash value of the data content contained in the node, when the "migration thread" contin-ues to use the two-tuple of the target node as searching index to address in the target data storage, content addressing will no longer be used.

In an illustrated implementation, the database may provide a function of "searching for the largest key value less than a certain value". The so-called "searching for the largest key value less than a certain value" function means a process of searching for a two-tuple key composed of [nid, hmax] stored in the database by addressing with a two-tuple key composed of [nid, h] as a searching index, where hmax is the largest block number of the block numbers which are smaller than h among the two-tuples of nodes stored in the database. That is, when determining hmax, first, the two-tuples with block numbers less than h stored in the database can be searched out. Then, the largest of the block numbers in the two-tuples searched out are taken as hmax.

In this case, when the "migration thread" continues to address in the target data storage according to the two-tuple of the target node, a two-tuple [nid, h] composed of the node ID of the target node (denoted as nid) and the migration threshold (denoted as h) can be taken as a searching index, to further search for a [nid, hmax] in the target data storage.

After the two-tuple [nid, hmax] is searched out, it can be further determined whether hmax is larger than the block number in the two-tuple of the target node. If so, at this time, it can be determined that the target data storage stores a data node having the same node ID as that of the target data node and the block number in the two-tuple larger than that of the target data node and smaller than the migration threshold. Otherwise, it means that the block number in the two-tuple of the target node is the largest block number smaller than the migration threshold. And at this time, it can be determined that in the target data storage there is no data node having the same node ID as that of the target data node and the block number in the two-tuple larger than that of the target data node and smaller than the migration threshold.

In the above technical solution, since among the nodes having block numbers in the two-tuples smaller than the migration threshold, as stored in the target data storage, the node corresponding to the largest block number in the two-tuple can be retained in the target data storage, other nodes will be migrated to the lower level data storage as history data.

Therefore, after the data migration is completed in the above manner, this is equivalent pruning the nodes on the MPT state tree stored in the database, removing the nodes that recorded history state data from the MPT state tree, migrating them to the lower level of data storage, and keeping storing and retaining nodes recording the latest state data in the current level of data storage. Therefore, it can achieve the hierarchical storage for the MPT state tree stored in the database.

It should be noted that the processing actions corresponding to the "block state update thread" and the "migration thread" may be performed concurrently. That is, the "block state update thread" and the "migration thread" may perform concurrent contention processing on the same node on the MPT state tree. Therefore, in an implementation application, in order to avoid the "block state update thread" and the "migration thread" performing concurrent contention processing on the same node to cause potential processing error, technical means can be used to ensure that at any one time, one thread can access the same node on the MPT state tree.

Here, at any time, it is guaranteed that one thread can access the same node on the MPT state tree. The specific technical means used is not specifically limited in the present disclosure. For example, in an implementation, a mutex technology, single-thread technology can be used, which will not be described in detail in the present disclosure.

Corresponding to the above method embodiment, the present application also provides some embodiments of an apparatus.

Corresponding to the above method embodiment, the present disclosure also provides some embodiments of a blockchain-based hierarchical storage apparatus.

Some embodiments of the blockchain-based hierarchical storage apparatus of the present disclosure can be applied to an electronic device. The apparatus embodiment can be implemented by software, or by hardware or a combination of software and hardware. Taking software implementation as an example, as an apparatus in a logical sense, it is formed by reading the corresponding computer program instructions in a non-volatile memory into a memory through a processor of an electronic device where it is located.

Figure 4:
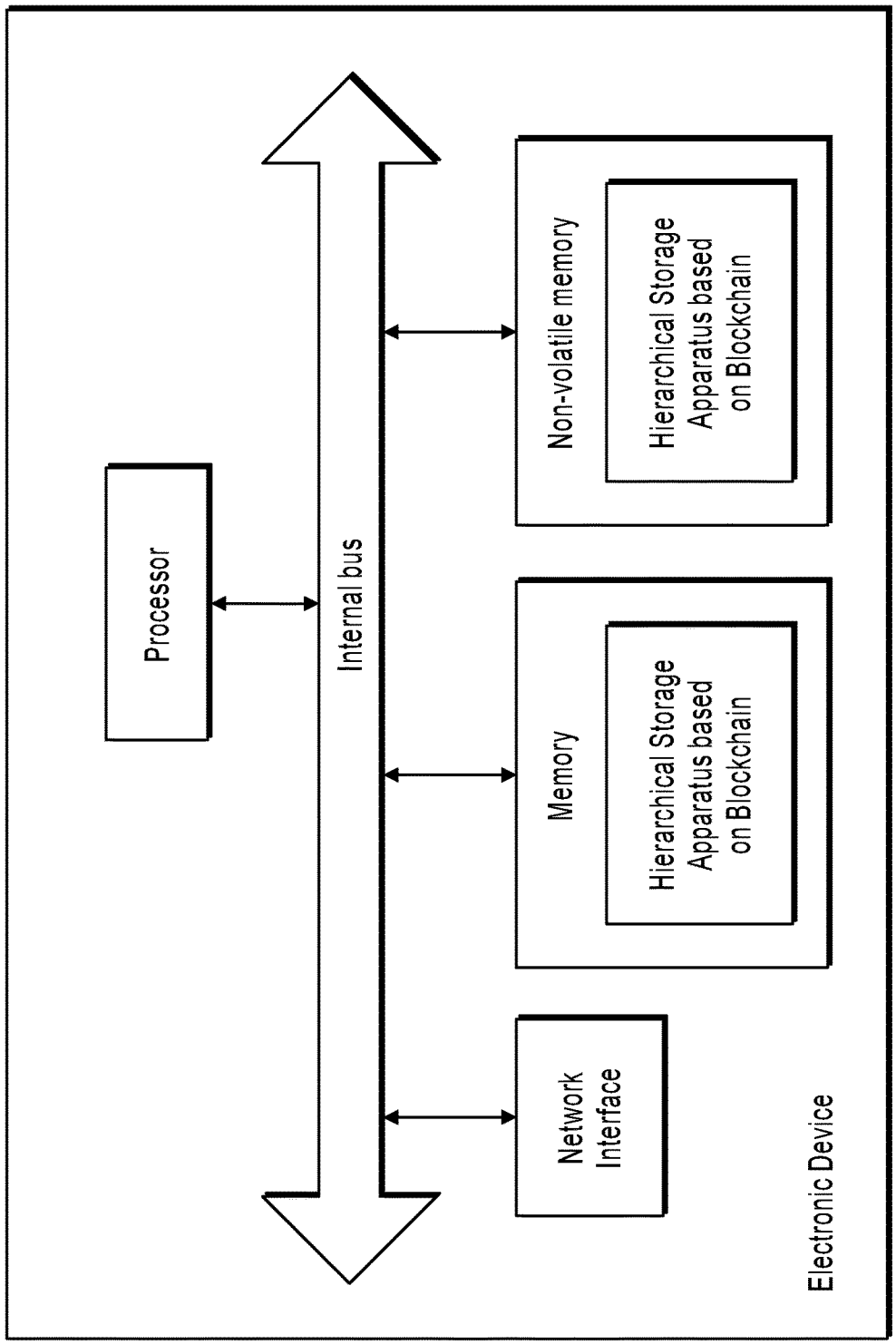
FIG. 4 is a schematic structural diagram of an electronic device according to an exemplary embodiment.

In terms of hardware, as shown in FIG. 4, which is a hardware structure diagram of an electronic device where the blockchain-based hierarchical storage apparatus of the present disclosure is located, in addition to the processor, the memory, the network interface, and the non-volatile memory, the electronic device in which the apparatus is located in some embodiments may generally include other hardware according to the actual function of the electronic device, details of which will not be elaborated herein.

Figure 5:
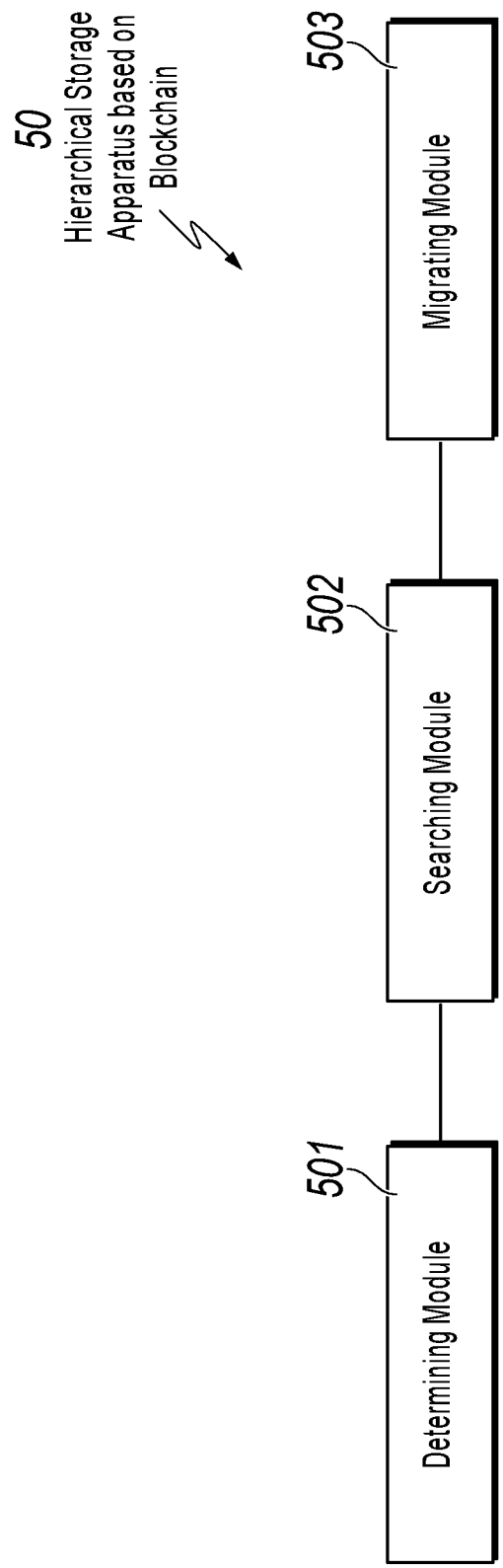
FIG. 5 is a block diagram of a blockchain-based hierarchical storage apparatus according to an embodiment of the present disclosure.

FIG. 5 is a block diagram of a blockchain-based hierarchical storage apparatus according to an embodiment of the present disclosure.

Referring to FIG. 5, the blockchain-based hierarchical storage apparatus 50 may be applied to an electronic device as shown in FIG. 4, wherein the data nodes on the state Merkle tree formed by the account state data of the blockchain are stored in the database in the form of key-value pairs Key-Value. A key of a key-value pair Key-Value is a two-tuple composed of a node ID of a data node and a block number labelled for the data node. The database includes multi-level data storage. The block number indicates the block where the data node is located when the data node has data update. The apparatus 50 includes: a determining module 501 configured to, when target data storage of any level in the database satisfies a data migration condition, determine a block number interval corresponding to data nodes in the target data storage that can be migrated to the lower level data storage; and determine a migration threshold based on the block number interval, wherein the migration threshold is a block number threshold larger than the block number interval; a searching module 502 configured to iteratively traverse the two-tuples of data nodes stored in the target data storage, to search for a target data node having a block number in the two-tuple smaller than the migration threshold; and a migrating module 503 configured to, according to the two-tuple of the target data node, further search the target data storage to check whether a data node having the same node ID as that of the target data node and the block number in the two-tuple larger than that of the target data node and smaller than the migration threshold exists; if such data node exists, migrate the target data node to the lower level data storage of the target data storage; otherwise, retain the target data node in the target data storage.

In some embodiments, the determining module 501 is configured to: when the block number interval is right-opened, determine the right endpoint value of the block number interval as the migration threshold; and when the block number interval is right-closed, determine the sum of the right endpoint value of the block number interval and an incremental step size of the block number of the blockchain as the migration threshold.

In some embodiments of the present disclosure, the migrating module 503 is further configured to: search for a data node stored in the target data storage that has the same node ID as that of the target data node, and the block number in the two-tuple being the largest block number among the block numbers smaller than the migration threshold; and determine whether the block number in the two-tuple of said data node is larger than the block number in the two-tuple of the target data node.

In some embodiments of the present disclosure, the apparatus 50 further includes: a storage module 504 (not shown in FIG. 5) configured to determine data nodes having data updates on the state Merkle tree of the latest block; create Key-Value pairs for the data nodes having data updates on the state Merkle tree of the latest block, and store the Key-Value pairs to the highest-level data storage in the database, wherein key of the Key-Value pair is a two-tuple composed of a block number of the latest block and a node ID of the data node; and the Value of the Key-Value pair is the data content contained in the data node.

In some embodiments of the present disclosure, the Merkle tree is a variant of the Merkle tree with a tree structure incorporating a Trie dictionary tree. The node ID of the data node is character prefix corresponding to the path from the root node to the data node of the MPT tree.

In some embodiments of the present disclosure, the state Merkle tree is a Merkle Patricia Tree state tree.

In some embodiments of the present disclosure, the database is a LevelDB database; or a database based on the LevelDB architecture.

In some embodiments of the present disclosure, the database is a Rocksdb database based on the LevelDB architecture.

In some embodiments of the present disclosure, the read-write performance of the storage medium corresponding to the multi-level data storage has a difference in performance. The read-write performance of the storage medium corresponding to the high-level data storage is higher than the read-write performance of the storage medium corresponding the low-level data storage.

The system, apparatus, module, or unit described in the foregoing embodiments may be specifically implemented by a computer chip or entity, or a product with a certain function. A typical implementation device is a computer, and the specific form of the computer may be a personal computer, a laptop computer, a cellular phone, a camera phone, a smart phone, a personal digital assistant, a media player, a navigation device, an email sending and receiving device, and a game console, a tablet computer, a wearable device, or a combination of any of these devices.

In a configuration, a computer includes one or more processors (CPUs), an input/output interface, a network interface, and a memory.

The memory may include a transitory memory, a random access memory (RAM), and/or a non-volatile memory in a computer-readable medium, such as a read-only memory (ROM) or a flash RAM. The memory is an example of a computer-readable medium.

The computer-readable medium includes either permanent or non-permanent, either removable or non-removable medium, which can store information by any method or technology. Information may be computer-readable instructions, data structures, modules of a program, or other data. Examples of computer storage media include, but are not limited to, a phase change memory (PRAM), a static random access memory (SRAM), a dynamic random access memory (DRAM), other types of random access memory (RAM), and a read-only memory (ROM), an electrically erasable programmable read-only memory (EEPROM), a flash memory or other memory technologies, a read-only disc, a read-only memory (CD-ROM), a digital versatile disc (DVD) or other optical storage, a magnetic tape cartridge, magnetic disk storage, a quantum memory, graphene-based storage media, or other magnetic storage devices or any other non-transmission media can be used to store information that can be accessed by computing devices. As defined herein, computer-readable media does not include temporary computer-readable media (transitory media), such as modulated data signals and carrier waves.

It should also be noted that the terms "including", "comprising" or any other variation thereof are intended to cover non-exclusive inclusion, so that a process, a method, a product or a device that includes a series of elements includes not only those elements, but also includes other elements that are not explicitly listed, or elements that are inherent to such process, method, product, or device. Without more restrictions, the elements defined by the sentence "including a . . . " do not exclude the existence of other identical elements in the process, method, product or device including the elements.

The specific embodiments of the present disclosure have been described above. Other embodiments are within the scope of the following claims. In some cases, the actions or steps recited in the claims may be performed in a different order than in some embodiments and the desired result may still be achieved. In addition, the processes depicted in the figures do not necessarily require the particular order shown or sequential order to achieve the desired results. In some embodiments, multitasking and parallel processing are also possible or may be advantageous.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

The above descriptions are merely some embodiments of the present disclosure, and are not intended to limit one or more embodiments of the present disclosure. Wherever within the spirit and principle of one or more embodiments of the present disclosure, any modification, equivalent replacement, improvement, etc. should be included in the protection scope of one or more embodiments of the present disclosure.

What is claimed:

1. A blockchain-based hierarchical storage method comprising:

determining target data storage of a storage level in a database satisfies a data migration condition, wherein the database comprises multi-level storage, wherein the database is a Merkle tree that stores account state data of a blockchain in key-value pairs, and wherein each key of the key-value pairs comprises a node identifier (ID) of a data node and a block number;

responsive to determining the target data storage in the database satisfies the data migration condition, determining a block number interval, wherein the block number interval comprises two or more numbers representing two or more blocks of the blockchain that are to be migrated;

determining a migration threshold based on an endpoint of the block number interval, wherein the migration threshold is a block number of the blockchain;

traversing one or more key-value pairs of the target data storage to identify a target data node associated with a block number smaller than the migration threshold;

traversing the target data storage to determine that the target data storage comprises a second data node having the same node ID as that of the target data node, wherein the second data node comprises a block number greater than a block number of the target data node and smaller than the migration threshold; and in response to determining that the target data storage comprises the second data node, migrating the target data node to a lower level of storage.

2. The method according to claim 1, wherein determining the migration threshold comprises:

determining a right endpoint of the block number interval as the migration threshold if the block number interval is right-open; and determining a sum of the right endpoint and a step size of one or more block numbers in the block number interval as the migration threshold if the block number interval is right-closed.

3. The method according to claim 1, wherein determining whether the target data storage comprises the second data node further comprises:

identifying a plurality of data nodes that comprise a node ID equal to the node ID of the target data node and block numbers smaller than the migration threshold;

identifying, a data node of the plurality of data nodes that comprises a largest block number; and determining whether the data node of the plurality of data nodes comprises a block number greater than the block number associated with the target data node.

4. The method according to claim 1, further comprising:

determining a plurality of data nodes that are updated in a state Merkle tree associated with a latest block appended to the blockchain;

generating KVPs corresponding to the plurality of data nodes; and storing the KVPs to a highest-level of data storage with highest storage cost in the database, wherein values of the KVPs are data content of corresponding data nodes.

5. The method according to claim 4, wherein the state Merkle tree has a tree structure constructed based on a Merkle tree and a prefix tree, and wherein a node ID of a data node of the state Merkle tree is a prefix character corresponding to a path from a root node to the data node of the state Merkle tree.

6. The method according to claim 5, wherein the state Merkle tree is a Merkle Patricia tree (MPT).

7. The method according to claim 1, wherein the database is a LevelDB database.

8. The method according to claim 7, wherein the database is a RocksDB database.

9. The method according to claim 1, wherein storage with lower storage cost has lower read-write performance.

10. A computer-implemented system, comprising one or more computers, and one or more computer memory devices interoperably coupled with the one or more computers and having tangible, non-transitory, machine-readable media storing one or more instructions that, when executed by the one or more computers, perform operations comprising:
   determining target data storage of a storage level in a database satisfies a data migration condition, wherein the database comprises multi-level storage, wherein the database is a Merkle tree that stores account state data of a blockchain in key-value pairs, and wherein each key of the key-value pairs comprises a node identifier (ID) of a data node and a block number;
   responsive to determining the target data storage in the database satisfies the data migration condition, determining a block number interval, wherein the block number interval comprises two or more numbers representing two or more blocks of the blockchain that are to be migrated;
   determining a migration threshold based on an endpoint of the block number interval, wherein the migration threshold is a block number of the blockchain;
   traversing one or more key-value pairs of the target data storage to identify a target data node associated with a block number smaller than the migration threshold;
   traversing the target data storage to determine that the target data storage comprises a second data node having the same node ID as that of the target data node, wherein the second data node comprises a block number greater than a block number of the target data node and smaller than the migration threshold; and
   in response to determining that the target data storage comprises the second data node, migrating the target data node to a lower level of storage.

11. The computer-implemented system according to claim 10, wherein determining the migration threshold comprises:
   determining a right endpoint of the block number interval as the migration threshold if the block number interval is right-open; and
   determining a sum of the right endpoint and a step size of one or more block numbers in the block number interval as the migration threshold if the block number interval is right-closed.

12. The computer-implemented system according to claim 10, wherein determining whether the target data storage comprises the second data node further comprises:
   identifying a plurality of data nodes that comprise a node ID equal to the node ID of the target data node and block numbers smaller than the migration threshold;
   identifying, a data node of the plurality of data nodes that comprises a largest block number; and
   determining whether the data node of the plurality of data nodes comprises a block number greater than the block number associated with the target data node.

13. The computer-implemented system according to claim 10, further comprising:
   determining a plurality of data nodes that are updated in a state Merkle tree associated with a latest block appended to the blockchain;
   generating KVPs corresponding to the plurality of data nodes; and
   storing the KVPs to a highest-level of data storage with highest storage cost in the database, wherein values of the KVPs are data content of corresponding data nodes.

14. The computer-implemented system according to claim 13, wherein the state Merkle tree has a tree structure constructed based on a Merkle tree and a prefix tree, and wherein a node ID of a data node of the state Merkle tree is a prefix character corresponding to a path from a root node to the data node of the state Merkle tree.

15. The computer-implemented system according to claim 14, wherein the state Merkle tree is a Merkle Patricia tree (MPT).

16. The computer-implemented system according to claim 10, wherein the database is a LevelDB database.

17. The computer-implemented system according to claim 16, wherein the database is a RocksDB database.

18. The computer-implemented system according to claim 10, wherein storage with lower storage cost has lower read-write performance.

19. A non-transitory, computer-readable medium storing one or more instructions executable by a computer system to perform operations comprising:
   determining target data storage of a storage level in a database satisfies a data migration condition, wherein the database comprises multi-level storage, wherein the database is a Merkle tree that stores account state data of a blockchain in key-value pairs, and wherein each key of the key-value pairs comprises a node identifier (ID) of a data node and a block number;
   responsive to determining the target data storage in the database satisfies the data migration condition, determining a block number interval, wherein the block number interval comprises two or more numbers representing two or more blocks of the blockchain that are to be migrated;
   determining a migration threshold based on an endpoint of the block number interval, wherein the migration threshold is a block number of the blockchain;
   traversing one or more key-value pairs of the target data storage to identify a target data node associated with a block number smaller than the migration threshold;
   traversing the target data storage to determine that the target data storage comprises a second data node having the same node ID as that of the target data node, wherein the second data node comprises a block number greater than a block number of the target data node and smaller than the migration threshold; and
   in response to determining that the target data storage comprises the second data node, migrating the target data node to a lower level of storage.

20. The non-transitory, computer-readable medium of claim 19, wherein determining the migration threshold comprises:
   determining a right endpoint of the block number interval as the migration threshold if the block number interval is right-open; and
   determining a sum of the right endpoint and a step size of one or more block numbers in the block number interval as the migration threshold if the block number interval is right-closed.

* * * * *

UNITED STATES PATENT AND TRADEMARK OFFICE
CERTIFICATE OF CORRECTION

PATENT NO. : 11,036,720 B2  
APPLICATION NO. : 16/790605  
DATED : June 15, 2021  
INVENTOR(S) : Lu et al.

Page 1 of 1

It is certified that error appears in the above-identified patent and that said Letters Patent is hereby corrected as shown below:

On the Title Page

Column 2, Other Publications, Line 2, delete "Confemece" and insert -- Conference --, therefor.

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*